UNITED STATES PATENT OFFICE.

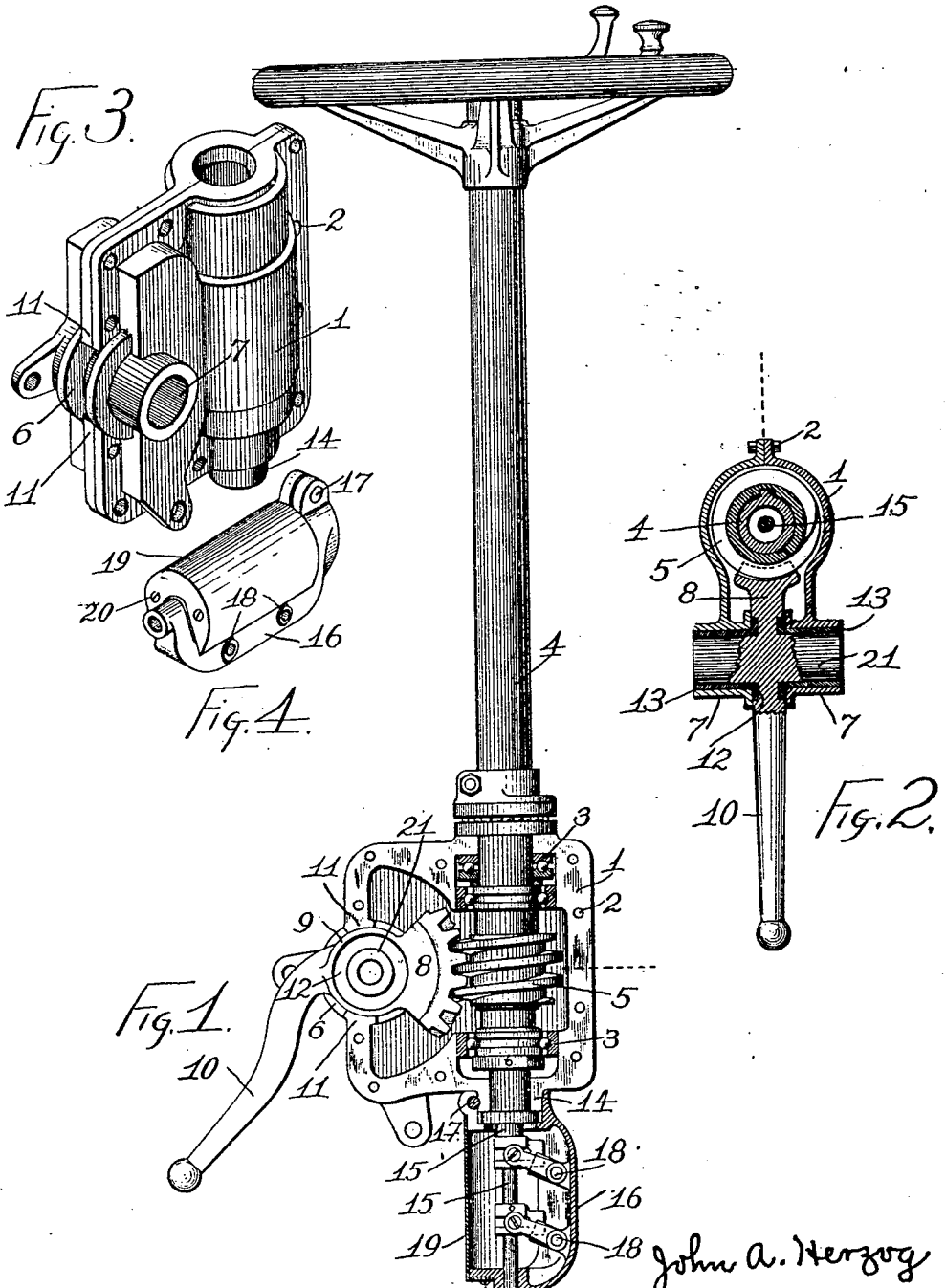

JOHN A. HERZOG, OF TOLEDO, OHIO, ASSIGNOR TO THE DE LUXE MOTOR CAR CO., OF DETROIT, MICHIGAN.

VEHICLE STEERING-GEAR.

No. 866,133.      Specification of Letters Patent.      Patented Sept. 17, 1907.

Application filed June 15, 1907. Serial No. 379,121.

*To all whom it may concern:*

Be it known that I, JOHN A. HERZOG, a citizen of the United States, residing at Toledo, Lucas county, Ohio, have invented certain new and useful Improvements in Vehicle Steering-Gears, of which the following is a specification.

This invention, pertaining to steering gears for such vehicles as automobiles, for instance, will be readily understood from the following description taken in connection with the accompanying drawing in which:—

Figure 1 is a side elevation, part vertical section, of a steering gear embodying my invention, one of the halves of the main casing being removed: Fig. 2 a horizontal section of the same: Fig. 3 a perspective view of the main casing: and Fig. 4 a perspective view of the sub-casing.

In the drawing:—1, indicates the gear casing formed in two halves united by a vertical joint in the vertical plane of the axis of the steering-post, the casing being flanged and perforated at the joint for the reception of joint-bolts: 2, the perforations in the flange of the casing for the joint-bolts: 3, steering-post bearings in the upper and lower portions of the gear casing: 4, the steering-post, having its lower portion journaled in these bearings: 5, a worm fast on the steering-post within the gear-casing: 6, a vertical slot formed in the rear wall of the gear-casing, in the joint between the two halves of the casing: 7, horizontal trunnion-bearings carried by the gear-casing with their common axis horizontal and crossing the slot 6 in the rear wall of the casing: 8, a worm-gear sector engaging the worm and having trunnions engaging the trunnion-bearings: 9, the hub of the worm-gear sector, this hub being disposed in the slot 6 and filling it sidewise and having upper and lower peripheral surfaces concentric with the axis of the trunnions: 10, the steering arm, projecting out rigidly from the hub of the worm-gear sector: 11, the upper and lower margins of the slot 6 in the rear of the gear-casing, these margins fitting neatly against the upper and lower peripheral surfaces of the hub of the worm-gear sector: 12, annular recesses in the faces of the hub of the worm-gear sector, concentric with the axis of the trunnions: 13, bushings disposed in the trunnions-bearings and engaging the trunnions and having inner flanges projecting into the slot in the rear wall of the casing and neatly fitting within the annular recesses in the faces of the hub of the worm-gear sector: 14, a cylindrical nose projecting down from the base of the gear-casing concentric with the axis of the steering-post: 15, the controlling spindles extending as usual through the steering-post, these spindles extending below the nose 14 and carrying devices for operating the spark and throttle levers: 16, a housing having at its upper end a split clamp fitting the nose of the gear-casing: 17, a lug and bolt device for clamping the housing firmly to the nose of the gear-casing: 18, the pivots of the spark and throttle levers, journaled in the housing 16: 19, a shell, of generally circular form, adapted to fit flanges on the upper and lower ends of the housing 16 and make a tight joint therewith and also with the main body-portion of the housing, this shell having a base flange to come under the base flange of the housing: 20, screws engaging the base flanges of the shell and housing and securing them together: and 21, the trunnions of the worm-gear sector.

The steering-arm and the worm-gear segment and the axis of the steering-post are, it will be observed, all brought into a common vertical plane. The housing and shell, when united and in place, form a sub-casing. The sub-casing being removed, and one-half of the gear-casing being removed, leaves the steering-post and worm and gear and arm in normal relationship for general inspection. The upper and lower margins 11 of the gear-casing have wiping contact on the hub of the worm-gear sector, and the sides of the slot fit against the hub, the exit of oil and entrance of dust being thereby prevented. The trunnion bushings 13 serve the ordinary bushing purposes of providing readily renewable bearing surfaces of choice material, and the flanged construction of the bushings permits of their ready insertion and removal and gives increased length of trunnion-bearings and permits the hub to serve in holding the bushings in place in the bearings without extraneous fastening devices.

The sub-casing forms a complete dust-tight inclosure for the spark and throttle levers and their spindle attachments. By removing screws 20, shell 19 can be withdrawn down endwise, thus exposing the interior of the sub-casing, and by unclamping the housing the entire sub-casing structure can be removed from the gear-casing.

I claim:

1. A steering gear comprising a pair of casing-halves united by a vertical joint and having post-bearings in its upper and lower walls and a slot in the joint between its halves, trunnion-bearings carried by the casing-halves at the opposite sides of said slot, a steering post journaled in the post-bearings, a worm on the steering-post within the casing, a worm-gear sector engaging the worm and having a hub engaging the sides of the casing-slot and having its upper and lower concentric portions engaging the upper and lower margins of the slot, trunnions projecting from said hub into engagement with the trunnions-bearings, and a steering-arm projecting from the hub exterior to the casing, combined substantially as set forth.

2. A steering gear comprising a pair of casing-halves united by a vertical joint and having post-bearings in its upper and lower walls and a slot in the joint between its halves, trunnion-bearings carried by the casing-halves at the opposite sides of said slot, a steering-post journaled in the post-bearings, a worm on the steering-post within the casing, a worm-gear sector engaging the worm and having a hub engaging the sides of the casing-slot and having upper and lower concentric portions engaging the upper and lower margins of the slot and having its hub-faces concentrically grooved, trunnions projecting from said hub into engagement with the trunnion-bearings, bushings carried by the trunnion-bearings and having inner end flanges projecting into the concentric recesses of said hub, and a steering-arm projecting from the hub exterior to the casing, combined substantially as set forth.

3. A steering gear comprising a pair of casing-halves united by a vertical joint and having post-bearings in its upper and lower walls and a slot in the joint between its halves, trunnion-bearings carried by the casing-halves at the opposite sides of said slot, a steering-post journaled in the post-bearings, a worm on the steering-post within the casing, a worm-gear sector engaging the worm and having a hub engaging the sides of the casing-slot and having its upper and lower concentric portions engaging the upper and lower margins of the slot, trunnions projecting from said hub into engagement with the trunnion-bearings, a steering-arm projecting from the hub exterior to the casing, and a sub-casing removably secured to the lower wall of the pair of casing-halves, combined substantially as set forth.

4. A steering gear comprising a pair of casing-halves united by a vertical joint and having post-bearings in its upper and lower walls and a slot in the joint between its halves, trunnion-bearings carried by the casing-halves at the opposite sides of said slot, a steering-post journaled in the post-bearings, a worm on the steering-post within the casing, a worm-gear sector engaging the worm and having a hub engaging the sides of the casing-slot and having its upper and lower concentric portions engaging the upper and lower margins of the slot, trunnions projecting from said hub into engagement with the trunnion-bearings, a steering-arm projecting from the hub exterior to the casing, a circular nose projecting downward from the lower wall of the joined casing-halves concentric with the axis of the steering-post, and a sub-casing carrying at its top a clamp engaging said nose, combined substantially as set forth.

5. A steering gear comprising a pair of casing-halves united by a vertical joint and having post-bearings in its upper and lower walls and a slot in the joint between its halves, trunnion-bearings carried by the casing-halves at the opposite sides of said slot, a steering-post journaled in the post-bearings, a worm on the steering-post within the casing, a worm-gear sector engaging the worm and having a hub engaging the sides of the casing-slot and having upper and lower concentric portions engaging the upper and lower margins of the slot, trunnions projecting from said hub into engagement with the trunnion-bearings, a steering-arm projecting from the hub exterior to the casing, a circular nose projecting downward from the joined casing halves concentric with the steering-post, a housing having upper and lower flanges, a clamp carried by the top of the housing and engaging said nose, and a shell removably fitting the flanges and body of the housing, combined substantially as set forth.

JOHN A. HERZOG.

Witnesses:
WILLIAM J. CLARE,
CORAINNE MOORE.